Jan. 4, 1966  E. E. REESE  3,227,001
FLEXIBLE PIN JOINT
Filed Jan. 16, 1964

INVENTOR.
ELMER E. REESE
BY
*W. E. Finder*
HIS ATTORNEY

United States Patent Office 3,227,001
Patented Jan. 4, 1966

3,227,001
FLEXIBLE PIN JOINT
Elmer E. Reese, Rochester, N.Y., assignor to General Motors Corporation, Detroit, Mich., a corporation of Delaware
Filed Jan. 16, 1964, Ser. No. 338,220
6 Claims. (Cl. 74—581)

This invention pertains to windshield wiper linkage drives, and particularly to an improved flexible pin joint for use in such linkage drives.

One of the problems associated with linkage drives for windshield wipers is that of misalignment between components of the drive system. This misalignment can cause binding and excessive wear at the joints between the linkage components thereby resulting in noisy operation and premature failure of the linkage drive. In the past it has been customary to use ball and socket type universal joints at certain points of connection in the linkage which are most susceptible to misalignment, for example at the joints between the outer ends of the drive links and the crank arms of the pivot shafts. However, in interest of economy other joints in the linkage drive have comprised only a pin which is journaled in a sleeve bearing. The typical linkage drive of the aforesaid type is disclosed in Contant Patent 3,025,552.

The present invention relates to an economical flexible pin joint which permits limited universal movement between the components of the linkage drive. Accordingly, among my objects are the provision of a flexible pin joint for use in a windshield wiper linkage drive embodying means permitting limited universal movement between the linkage components connected thereby; the further provision of a flexible pin joint of the aforesaid type including a grommet of elastomeric material and coacting spherical parts permitting limited universal movement through deformation of the grommet; and the still further provision of a flexible pin of the aforesaid type including a grommet of elastomeric material and a pair of coacting spherical parts wherein the grommet is designed to control axial end play as well as permit universal movement between the components of the linkage drive.

The aforementioned and other objects are accomplished in the present invention by forming a spherical surface on the bearing through which the pin extends and supporting the bearing for rocking, or limited universal, movement so as to accommodate misalignment in the linkage drive. Specifically, two embodiments of an improved flexible pin joint are disclosed herein. In both embodiments the spherical surface of the bearing coacts with a spherical socket retainer and the bearing is supported in an elastomeric grommet. In the preferred embodiment the grommet also controls axial end play between the linkage components connected by the pin joint.

Further objects and advantages of the present invention will be apparent from the following description, reference being had to the accompanying drawing, wherein preferred embodiments of the present invention are clearly shown and wherein similar numerals depict similar parts throughout the several views.

Figure 1:
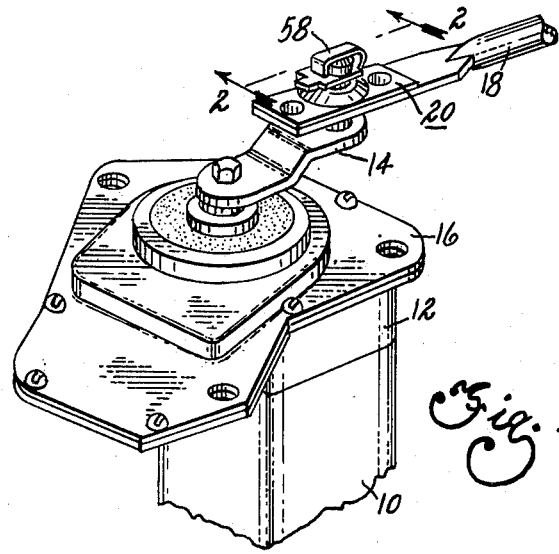
FIGURE 1 is a fragmentary perspective view of the improved flexible pin joint shown in combination with a portion of a windshield wiper linkage drive.

With reference to FIGURE 1, the improved flexible pin joints of the present invention are specifically designed for use in a windshield wiper linkage drive for imparting oscillation to a pair of wiper blades across the outer surface of a windshield, not shown. In installations of this type the two wiper blades are carried by wiper arms attached to spaced pivot shafts, the pivot shafts being connected by suitable linkage means to a power source, such as an electric motor 10. The electric motor 10 is coupled through a gear reduction unit 12 to a rotary crank arm 14. The motor and gear reduction assembly includes a mounting flange 16 for attaching this assembly to a suitable support within the vehicle. The outer end of the rotary crank arm 14 is connected to the inner end of a drive link 18 through a flexible pin joint 20 constructed according to the present invention.

Figure 2:
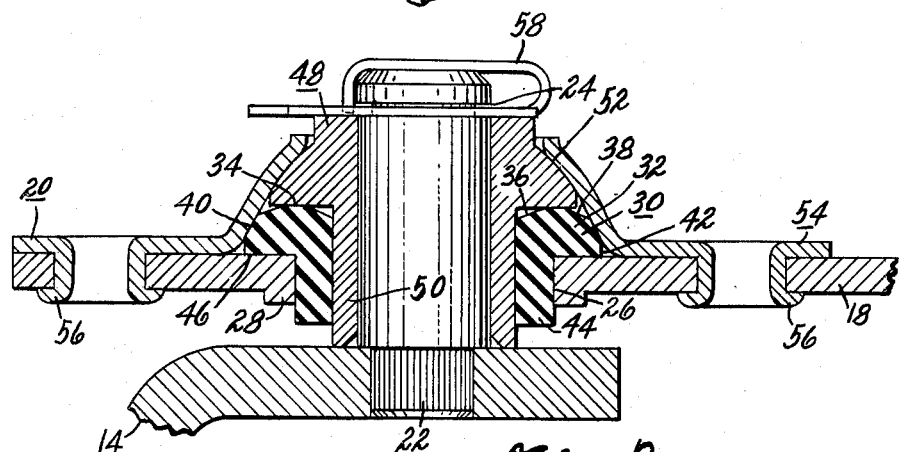
FIGURE 2 is an enlarged fragmentary sectional view taken along line 2—2 of FIGURE 1 depicting an embodiment of the flexible pin joint.

Referring to FIGURE 2, in the first embodiment of the flexible pin joint constructed according to the present invention, the crank arm 14 has an upstanding crank pin 22 rigidly attached thereto. The crank pin 22 is formed with an annular groove 24 adjacent its outer end. The end of the link 18 is formed with an enlarged aperture 26 having a flanged edge 28 for receiving a deformable elastomeric grommet 30 which may be composed of either rubber or polyurethane.

As seen in FIGURE 2, the elastomeric grommet 30 is formed with a flange, or shoulder, 32 surrounding the aperture 26 in the link, and this flange 32 is formed with a flat upper surface 34, angular flat surfaces 36 and 38 on opposite sides of the flat surface 34 and an angular flat surface 40 which intersects the angular flat surface 38 and a cylindrical rim portion 42. The shank 44 of the grommet is tightly fitted within the aperture 26 of the link, and the bottom surface 46 of the flange 32 is in intimate engagement with the upper surface of link 18 surrounding the aperture 26 therein. A bearing 48, preferably of sintered bronze, is inserted through the grommet 30. The bearing 48 includes an elongate sleeve portion 50 which abuts the upper surface of the crank arm 14. The bearing 48 is also formed with a flange having a spherical surface portion 52 and is retained in position by a spherical socket retainer 54 riveted at 56 to the link 18.

After the elastomeric grommet 30, bearing 48 and socket retainer 54 have been assembled with the link 18, the crank pin 22 is inserted through the bearing 48, and a spring retainer clip 58 is assembled in the annular groove 24 of the crank pin to secure the connection. The flexible pin joint depicted in FIGURE 2 permits limited universal or rocking movement between the crank arm 14 and the link 18 during rotation of the crank arm 14 so as to accommodate for any misalignment in component parts in the linkage drive. This rocking movement is permitted by virtue of the coacting spherical surfaces portion on the bearing 48 and the socket retainer 54 by deformation of the flange 32 on the grommet 30.

Figure 3:
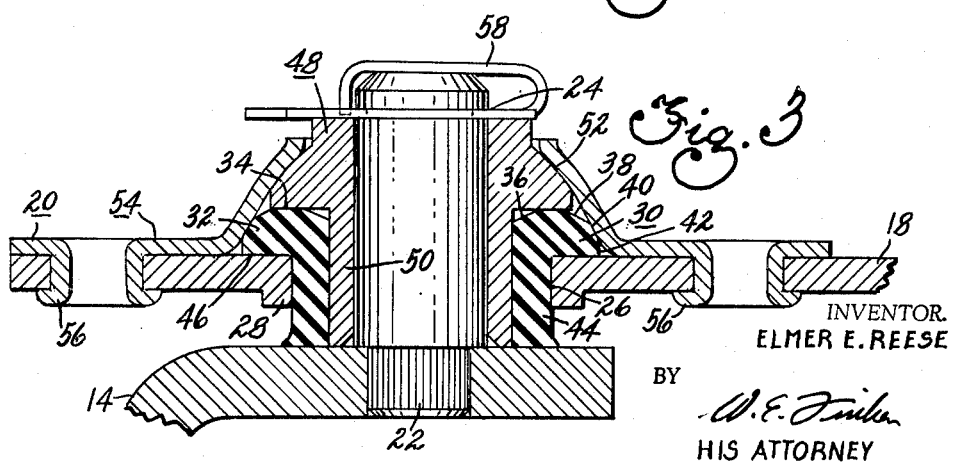
FIGURE 3 is an enlarged fragmentary view similar to FIGURE 2 depicting the preferred embodiment of the flexible pin joint.

Referring to FIGURE 3, in the preferred embodiment the flexible pin joint, shank portion 44 of the grommet 30 is elongated so as to be of greater axial length than the sleeve portion 50 of the bearing 48. Thus, in the preferred embodiment the shank portion of the grommet extends beyond the end of the bearing 48 before assembly with the crank pin 22, so that the end thereof is deformed and has intimate contact with the upper surface of the crank arm 14 when the crank pin is assembled therewith as shown in FIGURE 3. By extending the length of the shank portion 44 of the grommet 30 the flexible pin joint will permit not only limited universal or rocking movement between the link 18 and the crank arm 14 but will also control axial end play between the crank arm 14 and the link 18. Thus, in the preferred embodiment shown in FIGURE 3 the elastomeric grommet 30 is partially deformed, or stressed, by the attachment of the spring clip 58 due to the extended length of the shank 44 on the grommet when the spring retainer clip 58 is attached to the crank pin 22. In the embodiment shown in FIGURE 2 the end play between the link 18 and the crank arm 14 is controlled solely by the spring retainer clip 58.

The deformation of the flange 32 of the grommet 30 upon relative movement between the link 18 and the crank arm 14 is facilitated by the angular surfaces 36, 38 and 40 which define voids between the grommet 30 and the bearing 48, and between the grommet 30 and the socket retainer 54 as clearly shown in FIGURES 2 and 3. It is to be understood that the flange 32 of the grommet is initially deformed, or stressed, by the attachment of the socket retainer 54. By enabling rocking movement between the crank pin of the crank arm 14 and the link 18 through the deformable grommet 30 and the coacting spherical parts of the bearing and the retainer socket, the tendency of the pin 22 to enlarge the sleeve bearing will be eliminated thus preventing looseness in the joint with its attendant noise and premature failure.

While the embodiments of the invention as herein disclosed constitute preferred forms, it is to be understood that other forms might be adopted.

What is claimed is as follows:

1. A flexible pin joint for connecting component parts of a windshield wiper linkage drive including, a first part having an upstanding crank pin, a second part having an aperture for receiving said crank pin, a deformable elastomeric grommet fitting said aperture having a shank extending through said aperture and an end flange seated against said second part, a bearing extending through said grommet having a spherical surface portion, a socket retainer attached to said second part having a spherical surface coacting with the spherical surface portion of said bearing, said crank pin extending through said bearing, and a retainer clip attached to said crank pin and abutting said bearing, the flange of said grommet being deformable to accommodate rocking movement between the first and second parts to accommodate misalignment in the component parts of the linkage drive.

2. A construction of the class described comprising, a crank pin, a link having a bearing receiving said crank pin, said bearing having a spherical surface portion, a retainer socket attached to said link and having a spherical surface portion coacting with the spherical surface portion on said bearing, a deformable elastomeric grommet interposed between said bearing and said link, and a retainer clip interlocked with said crank pin to hold said crank pin in assembled relation with the link, said grommet being deformable to permit limited universal movement between the bearing and the retainer socket upon displacement of the link relative to the crank pin.

3. A construction of the class described comprising, a crank pin, a link having a bearing receiving said crank pin, said bearing having a spherical surface portion, a retainer socket attached to said link and having a spherical surface portion coacting with the spherical surface on said bearing, a deformable elastomeric grommet having a shank portion surrounding a portion of said bearing and an end flange confined between the bearing and the link, and a retainer clip interlocked with said crank pin to hold said crank pin in assembled relation with the link, said grommet being deformable to permit limited universal movement between the bearing and the retainer socket upon displacement of the link relative to the crank pin.

4. A construction of the class described comprising, a crank pin, a link having an aperture, a deformable elastomeric grommet fitting said aperture and having a shank portion and an end flange, a bearing extending through said grommet for receiving said crank pin, said bearing having a flange with a spherical surface portion, a retainer socket attached to said link having a spherical surface portion coacting with the spherical surface portion of the flange of said bearing and maintaining the flange of said bearing in contact with the flange of said grommet, and a spring retainer clip interlocked with said crank pin to hold said crank pin in assembled relation with the link, the flange of said grommet being deformable to permit limited universal movement between said bearing and said retainer socket upon displacement of the link relative to the crank pin.

5. The construction set forth in claim 4 wherein the crank pin is attached to a crank arm, wherein said bearing includes a sleeve portion which abuts said crank arm, and wherein axial end play between the crank arm and the link is controlled by said spring retainer clip.

6. The construction set forth in claim 4 wherein the crank pin is attached to a crank arm, wherein said bearing includes a sleeve portion having abutting engagement with said crank arm, and wherein the shank portion of said grommet is of greater axial extent than the sleeve portion of said bearing so as to be deformed upon attachment of said retainer clip so as to control axial end play between the crank arm and the link.

References Cited by the Examiner
UNITED STATES PATENTS

| | | | |
|---|---|---|---|
| 2,170,264 | 8/1939 | Horton | 250—27 |
| 2,768,530 | 10/1956 | Brundage | 250—27 |
| 2,878,047 | 3/1959 | Booth. | |
| 3,133,769 | 5/1964 | Drake | 308—26 |

BROUGHTON G. DURHAM, *Primary Examiner.*

W. S. RATLIFF, *Assistant Examiner.*